United States Patent
Straight et al.

(10) Patent No.: US 6,554,129 B2
(45) Date of Patent: Apr. 29, 2003

(54) ATTACHMENTS IN MODULAR CONVEYOR BELTS

(75) Inventors: Michael R. Straight, Luling, LA (US); Richard M. Klein, Chalmette, LA (US); Christopher J. Verdigets, Ponchatoula, LA (US)

(73) Assignee: The Laitram Corporation, Harahan, LA (US)

( * ) Notice: Subject to any disclaimer, the term of this patent is extended or adjusted under 35 U.S.C. 154(b) by 68 days.

(21) Appl. No.: 09/802,204

(22) Filed: Mar. 8, 2001

(65) Prior Publication Data

US 2002/0125108 A1 Sep. 12, 2002

(51) Int. Cl.⁷ .......................... B65G 17/06; B65G 17/46
(52) U.S. Cl. .................... 198/699.1; 198/698; 198/801; 198/853
(58) Field of Search ............................. 198/699.1, 698, 198/853, 801, 836.1, 850, 836.4, 837, 844.1

(56) References Cited

U.S. PATENT DOCUMENTS

| | | | |
|---|---|---|---|
| 4,170,281 A | 10/1979 | Lapeyre | |
| D258,500 S | * 3/1981 | Kloefkorn et al. | 198/699 |
| 4,273,234 A | * 6/1981 | Bourgeois | 198/347 |
| 4,556,142 A | 12/1985 | Lapeyre | |
| 4,832,183 A | 5/1989 | Lapeyre | |
| 5,101,966 A | * 4/1992 | Lapeyre | 198/803.14 |
| 5,165,514 A | * 11/1992 | Faulkner | 198/801 |
| 5,247,789 A | 9/1993 | Abbestam et al. | |
| 5,261,525 A | 11/1993 | Garbagnati | |
| 5,310,045 A | 5/1994 | Palmaer et al. | |
| 5,469,956 A | 11/1995 | Greve et al. | |
| 5,490,591 A | * 2/1996 | Faulkner | 198/803.13 |
| 5,497,874 A | 3/1996 | Layne | |
| 5,634,550 A | 6/1997 | Ensch et al. | |
| 5,738,205 A | 4/1998 | Draebel | |
| 6,073,756 A | 6/2000 | Damkjaer et al. | |
| 6,332,531 B1 | * 12/2001 | Damkjaer | 198/690.2 |
| 6,382,404 B1 | * 5/2002 | Guldenfels | 198/850 |

* cited by examiner

Primary Examiner—Douglas Hess
(74) Attorney, Agent, or Firm—James T. Cronvich (57) ABSTRACT

A conveyor belt and an attachment element that firmly interlocks into a row of the conveyor belt. In one version, the attachment element includes a base from which two sets of hook-shaped appendages extend. The appendages each include a shank portion extending from the base and a hook portion angling from the shank portion to a distal end. The hook portions of the first set extend in different directions from the hook portions of the second set. Belt modules in the interconnected rows of the conveyor belt have receptacles that open onto an outer surface of the belt. The receptacles are shaped to receive the differently-directed appendages. Blocking surfaces bounding the receptacles constrain the differently-directed appendages against removal. In another version, the attachment element includes a flange that extends outward in a different direction from a set of appendages. The appendages are constrained from exiting the receptacles by the blocking surfaces when the flange contacts an outer blocking surface of the belt. The geometry of the appendages, the receptacles, and other belt structures admit the appendages during insertion from one direction in an assembly condition of the belt, but lock the attachment element in place when the belt is in an assembled conveying condition.

32 Claims, 6 Drawing Sheets

ATTACHMENTS IN MODULAR CONVEYOR BELTS

BACKGROUND

This invention relates generally to modular conveyor belts hingedly linked by hinge pins and, more particularly, to non-integral attachments in such conveyor belts.

Conveyor belts are widely used in many industries to transport articles. In the food and beverage industries, modular plastic belts, or chains, are often used because of their cleanability and their ability to operate with little lubrication. The modular belts are generally constructed of a plurality of rows of belt modules arranged side by side to form a belt row. The modules silo include hinge elements at each end. The hinge elements of consecutive rows are interleaved and interconnected by hinge pins to construct a conveyor belt of any desired length and width.

Usually, these belts form generally flat-top article-conveying surfaces. But some applications require accessories that deviate from the flat article-conveying surface. Sideguards, flights, rollers, holddown tabs, guides, and various inserts are just some examples of accessories added to belts to perform various functions. Flights that extend across the width of a belt at regular intervals are often used in transporting articles up or down inclined paths. Often the flights are integrally formed coextensive in width with an interleaved module to form a flighted module. Regularly spaced belt rows are then formed entirely of flighted modules to construct a belt with flights extending across the width of the belt at regular intervals.

As long as the integral flights do not extend beyond the sides of the module and do not include any complicated contours or openings, relatively simple molds can be machined to form flighted modules in an injection molding process. Otherwise, the mold can be expensive and difficult to use properly.

One shortcoming associated with integral flighted modules is that they must be made in a separate mold and represented by a separate part number from those of the standard non-flighted belt modules with which they are interconnected to form a conveyor belt. Another shortcoming is that, once a flight is damaged, the entire flighted module must be replaced.

To solve this last problem, detachable flights have been used. But these usually require attachment to a specially designed base module with a specially designed receptacle for the flight. Or the flight must be attached to some extra retainer, such as fastener hardware that could come loose and contaminate the conveyed product.

To overcome these shortcomings, there is a need for a conveyor belt that accepts accessory attachments of various configurations, including complicated topographies, without necessarily requiring special receptacle modules and without requiring additional fastening hardware.

SUMMARY

This need and others are satisfied by a conveyor belt and attachment element having features of the invention. The conveyor belt is constructed of a plurality of belt modules and hinge pins arranged in rows. Each row includes one or more side-by-side belt modules linked at leading and trailing ends to another row by hinge pins. The resulting belt has first and second, for example, top and bottom, outer surfaces. At least some of the rows include blocking structure and one or more receptacles opening onto an outer belt surface. Blocking surfaces formed in the belt modules form at least part of the boundaries, or walls, of the receptacles. An attachment element includes a contact member and a set of appendages. The appendages, which are preferably hook-shaped, extend outward from the attachment element. When appendages are inserted in the corresponding receptacles and the contact member is in contact with the blocking structure of the row, the blocking surfaces constrain the appendages to keep the attachment element in place in a conveying condition of the conveyor belt. This dual interaction of the appendages with the blocking surfaces of the receptacles and the contact member with the blocking structure locks the attachment assembly in place. In the conveying condition, each row of the belt generally defines a plane. In an assembly condition, one or more rows deviate from the planar configuration. The assembly condition can be achieved, for example, by removing a hinge pin from one end of a row of side-by-side modules. In the assembly condition, the dual interaction is absent and the appendages can be inserted into or removed from the receptacles.

In one version of the conveyor belt and attachment element, the contact member on the attachment is realized by one or more of a second set of appendages alternately arranged along the attachment element with the first-mentioned set. Each set is differently directed and can be inserted into or removed from the receptacles only in the assembly condition of a belt row.

In another version, the contact member is a hooked-shaped appendage that contacts a hinge pin's lateral surface, which serves as blocking structure and acts in tandem with blocking surfaces bounding the associated receptacles in the belt row to keep the appendages firmly in place.

In still another version, the contact member is a flange extending outward from the attachment member along its base. The first or second outer surface of the belt row serves as the blocking structure. In the assembly condition of the belt, the flange is out of contact with the blocking structure, and the attachment member can be inserted into and removed from the belt. In the conveying condition, the flange contacts the outer belt surface and, together with the interaction of the blocking surfaces of the receptacles with the appendages, keeps the attachment member in place.

The appendages, in a preferred version, include a shank portion extending from the attachment element with a distal hook portion angling away from the shank portion. The angle at which the hook portion extends from the shank portion determines the insertion angle at which the attachment element is oriented for its appendages to be inserted into and removed from the receptacles.

These various versions of attachment schemes allow for a variety of attachment elements with accessory portions of various functions and topographies to be incorporated into standard belt modules. The attachment elements can be tailored to the application or replaced when they are damaged or wear out without replacing the entire belt. The dual interaction of the appendages with the blocking surfaces and of the contact member with the blocking structure ensures a firm connection of the attachment element to the belt without extra fasteners that could come loose and contaminate conveyed products.

BRIEF DESCRIPTION OF THE DRAWINGS

These and other advantages, features, and aspects of the invention are described in more detail in the following description, appended claims, and accompanying drawings, in which:

DETAILED DESCRIPTION

Figure 1:
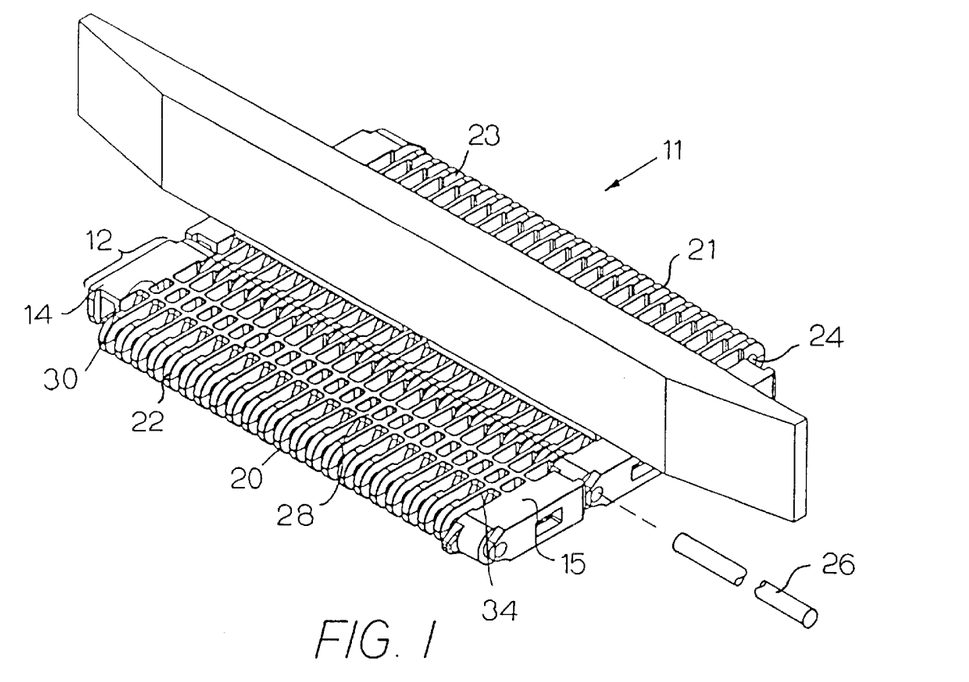
FIG. 1 is an isometric view of a portion of a conveyor belt and attachment element embodying features of the invention.
Figure 2:
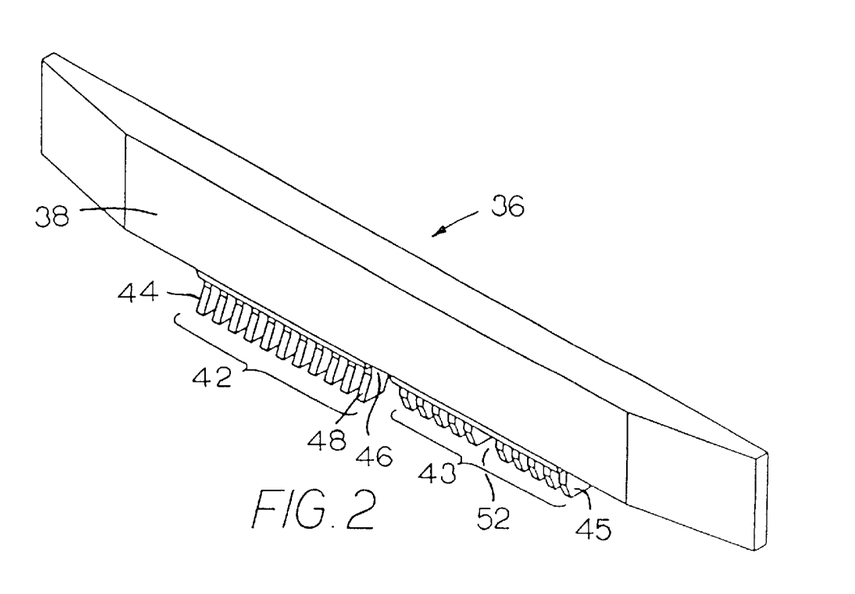
FIG. 2 is an isometric view of the attachment element of FIG. 1.
Figure 3:
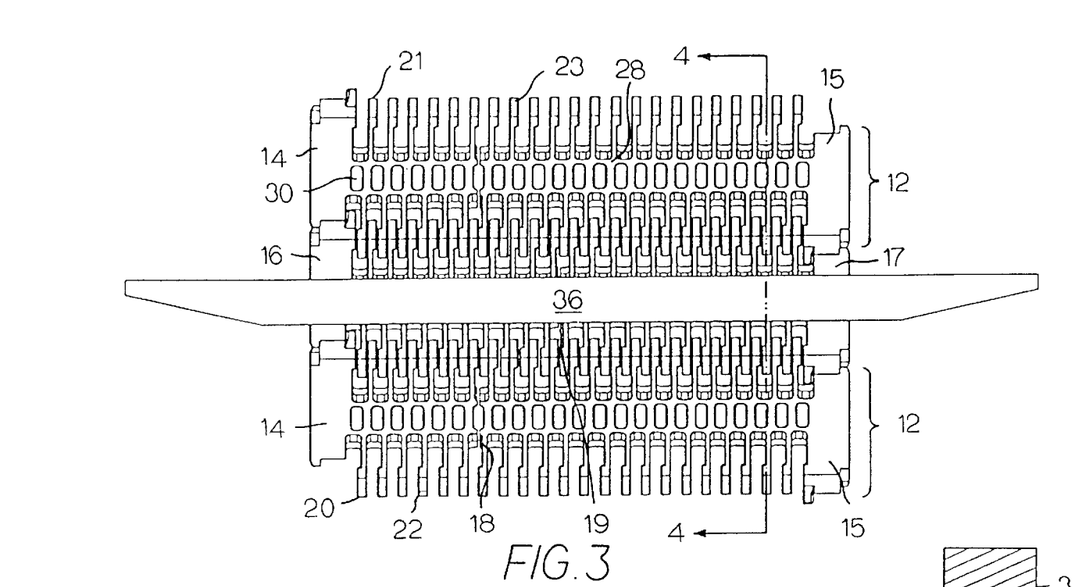
FIG. 3 is a top plan view of the conveyor belt and attachment element of FIG. 1.
Figure 4:
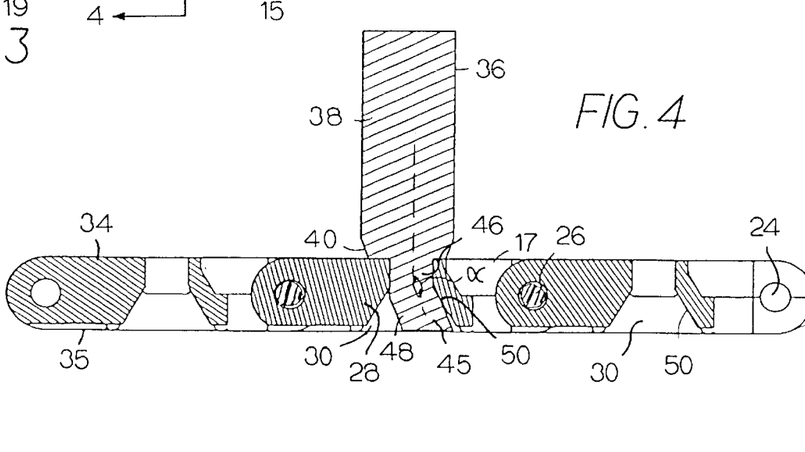
FIG. 4 is a cross-section of the conveyor belt and attachment element of FIG. 1 taken along line 4—4 of FIG. 3.

FIG. 1 shows a portion of a conveyor belt and an attachment element embodying features of the invention. FIGS. 2–4 show further details of the version shown in FIG. 1. The conveyor belt 11, in this version a modular conveyor belt, is made up of rows 12 of belt modules 14, 15, 16, 17. The modules are arranged preferably in a bricklaid fashion in which the seams, or gaps, between consecutively arranged side-by-side modules are discontinuous from row to row. For example, as best seen in FIG. 3, the seam 18 between modules 14 and 15 is not continuous with the seam 19 between modules 15 and 17 of the adjacent row. This increases the strength of the belt. Each module extends from a first end 20 to a second end 21 at which are formed respective hinge elements 22, 23. Holes 24 formed in the hinge elements receive hinge pins 26, which are retained in a conventional manner. The hinge pins may be headed or headless. The hinge elements 22 of one row are interleaved with the hinge elements 23 of an adjacent row and interlinked hingedly by hinge pins into a conveyor belt of any desired length and width depending on the size and numbers of modules used. One such belt is the INTRALOX Series 400 Flush Grid belt manufactured by Intralox, Inc. of Harahan, La., USA. Other similar modular plastic belts can also be used. The modules of these belts are typically formed by injection molding using thermoplastic materials such as polypropylene, polyethylene, polyester, and acetal. But metal and machined belt modules may also be used.

The belt modules include structure 28 that forms a series of receptacles 30 opening onto a first outer surface 34—in this example, a top surface—of the belt. (In other versions of the belt, the receptacles open onto a second outer surface 35, such as a bottom surface of the belt.) As shown in the example of FIGS. 1 and 3, the receptacles are uniformly spaced across the width of each belt row.

An attachment element 36—in this example, a flight—is attached along one row of the belt. Because the flight shown extends past the width of the belt, it would be difficult to make such a flight integrally molded with the belt modules. The attachment element includes an accessory portion 38 (the flight portion) and a preferably rigid base 40 along a side of the accessory portion. Extending from the base, better shown in FIGS. 2 and 4, are a first set 42 of appendages 44 and a second set 43 of appendages 45. The appendages of each set shown are generally identical, but need not necessarily be so. Each appendage has a shank portion 46 extending from the base of the attachment element with a hook portion 48 extending from the shank portion opposite the base. The hook portion preferably angles obliquely from the shank portion at a hook angle a, shown here as an obtuse angle. As shown in FIG. 2, the hook-shaped appendages 44 of the first set 42 extend in a first direction and the appendages 45 of the second set 43 extend in a different second direction. In the version shown, the appendages are mirror images of each other and extend in opposite directions along the direction of belt travel toward leading and trailing belt rows.

As shown in the cross-section of FIG. 4, the intermediate structure 28 of the conveyor belt modules includes a blocking surface 50 that forms a wall defining a boundary of the receptacle 30. The hook-shaped appendage 45 is shaped to complement the shape of the blocking surface. In the receptacles shown, the walls angle downward and outward from the top to form individual receptacles that also serve to act as drive pockets for the teeth of drive or idler sprockets. Depending on the placement of the sprockets across the width of the belt, it may be necessary to eliminate one or more appendages, such as the missing appendage at position 52, so as not to interfere with the sprocket teeth. Alternatively, the receptacle walls need not define drive pockets and could be parallel to the outer belt surface without forming individual pockets.

Figure 5:
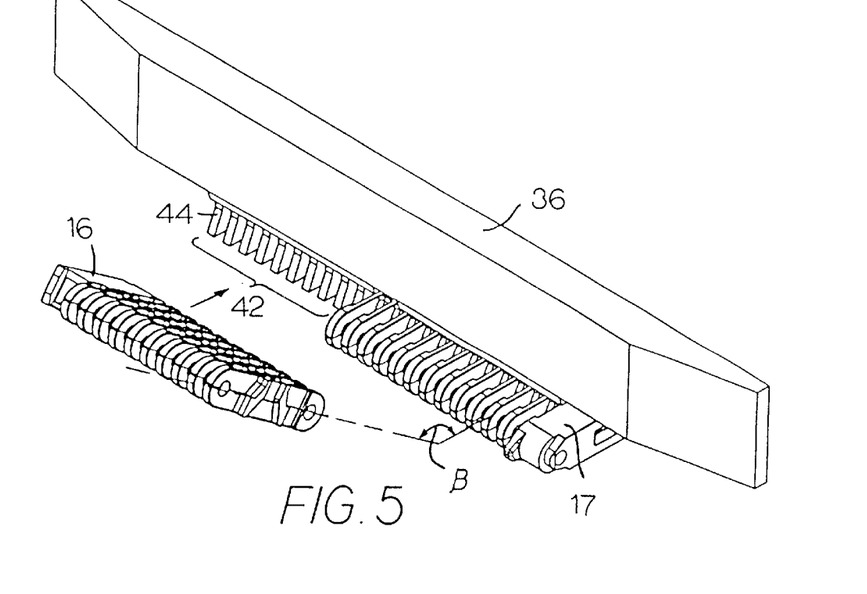
FIG. 5 is a pictorial view of the conveyor belt and attachment element of FIG. 1, illustrating the insertion of the attachment element into the belt.

The attachment of the attachment element 36 to two adjacent side-by-side belt modules 16, 17 is shown in FIGS. 4 and 5. The attachment is shown in FIG. 5 with its second set 43 of appendages 45 already attached to the second belt modules 17. As shown in the cross-section of FIG. 4, when the attachment element is in its operational position in a conveying condition of the belt, the appendages are retained in the receptacles, blocked from retreating vertically. Thus, each of the appendages of the second set acts as a contact member in contact with blocking structure in the belt module formed by the blocking surface. As shown in FIG. 5, the hook-shaped appendages 44 of the first set 42 are inserted into the receptacles along an insertion angle β, determined by the geometry of the appendages and the size of the receptacle openings. In particular, the hook angle α is roughly equal to the insertion angle β with some leeway on either side. Thus, by tilting the attachment element relative to the outer surface of the belt and aligning the appendages with the receptacle openings, one can insert the first set of appendages into the first module. Then, by rotating the attachment element relative to the belt module into the operational conveying position, one can lock the attachment in place. Because the second set of appendages nestled in the receptacles of the second module are directed opposite to the first set nestled in the first module, the attachment element is firmly locked in place once the row is connected into the belt at one or both ends with hinge pins. For relatively inflexible belt modules, the side-by-side modules must be free, by the absence of at least one hinge pin, to be oriented differently during assembly to admit the appendages without interference. Once the receptacles are admitted, the modules can be rotated to form a generally planar row and a hinge pin inserted to fix the row in a conveying condition.

Figure 6:
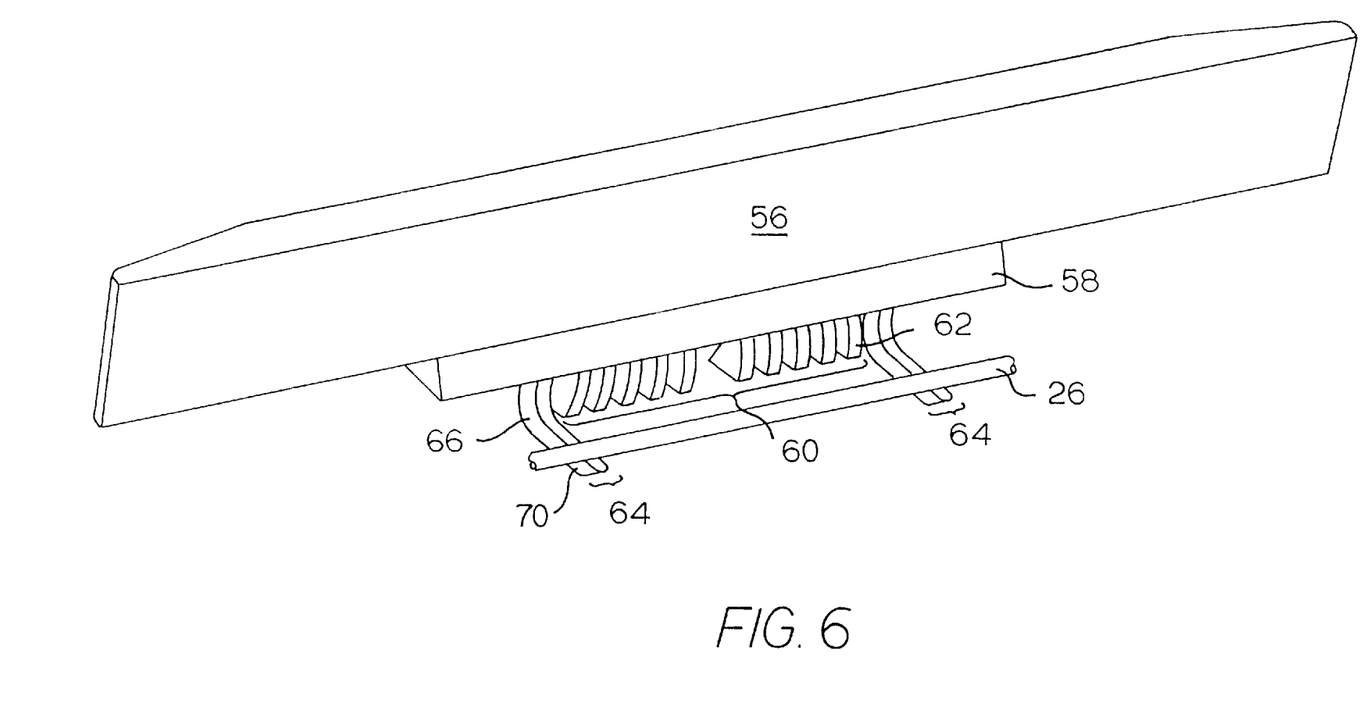
FIG. 6 is an isometric view of another version of attachment element embodying features of the invention retained partly by a hinge pin.
Figure 7:
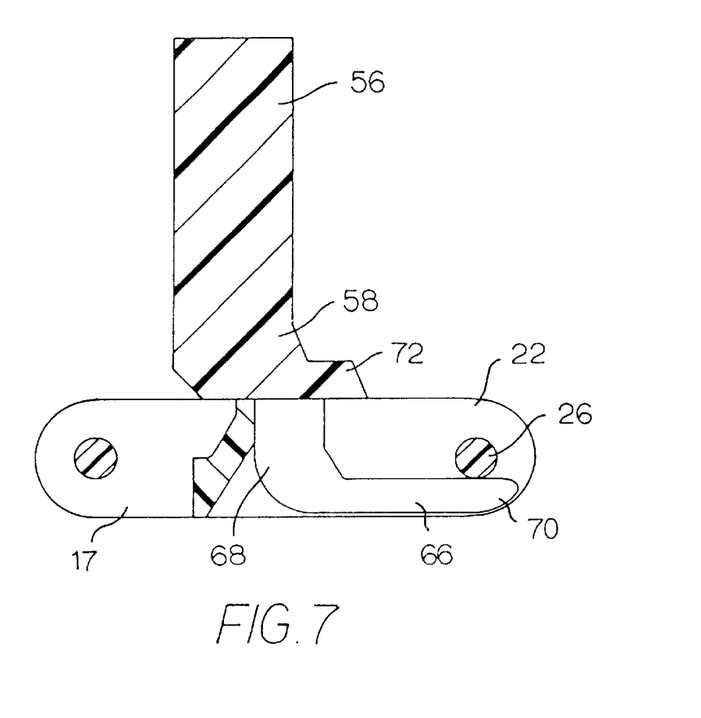
FIG. 7 is a side elevation cross-section of a belt module with the attachment element of FIG. 6.

Another version of attachment element is shown in FIGS. 6 and 7. The attachment element 56, like the attachment element 36, could include one of a variety of accessory portions. The attachment element 56 includes a base 58 from which extend two kinds of hook-shaped appendages. A first set 60 of appendages 62 is similar in form and function to the appendages of the attachment element 36. Flanking the first set of appendages are second sets 64 of appendages 66. (In this version, each second set includes only a single appendage.) Each appendage 66 includes a shank portion 68 and an elongated hook portion 70 extending at about 90° from the shank portion. The elongated hook portion 70 extends in the opposite direction (toward the opposite end of the module) of the hook portion of the first set 60 of appendages 62 and serves as a contact member. To accommodate each elongated appendage, a single hinge element 22 is removed from a belt module 17 to expose a portion of the hinge pin 26. The elongated hook portion 70 resides in the space left by the removed hinge element with its distal end retained by the lateral surface of the exposed hinge pin. The lateral surface serves as blocking structure. The base of the attachment element includes a horizontal extension 72 for added support. Alternatively, the elongated hook portions could extend in either direction. Furthermore, the elongated hook portion could be shaped to essentially replace the removed hinge element. In this case, the elongated hook portion would be taller than the example shown in FIGS. 6 and 7 so as to be coextensive from top to bottom with the hinge elements. An opening or a notch at the distal end of the elongated hook portion would encompass the blocking hinge pin completely or partially. These versions of attachments are, in some ways, easier to install into a row of belt modules because the appendages of the first set all fit in the same direction into the receptacles along the row, while the elongated appendages do not have to be inserted into the receptacles because they are retained, not by the structure of the module, but by the hinge pin.

Figure 8:
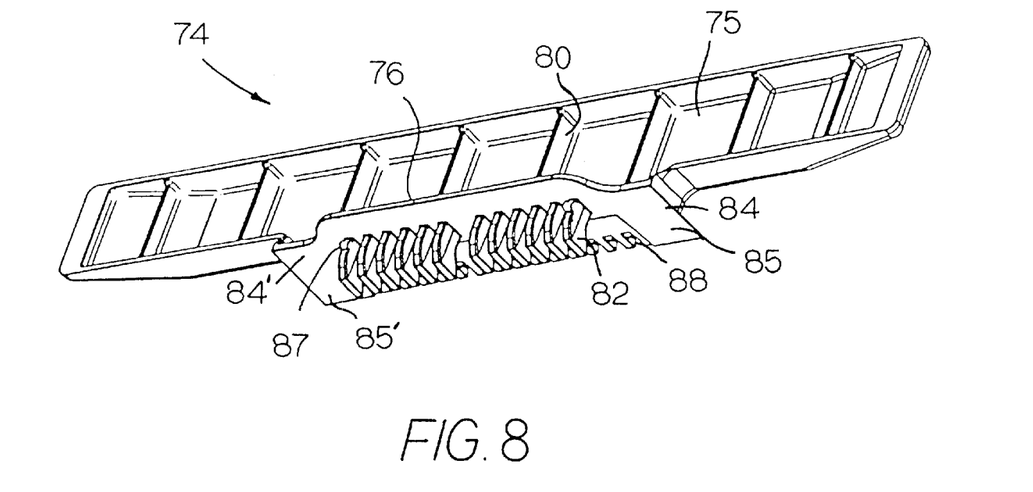
FIG. 8 is a bottom isometric view of yet another version of attachment element embodying features of the invention.

Another version of attachment element is shown in FIG. 8. This attachment element 74 includes a flighted accessory portion 75 and a planar base 76. The accessory flight has a front article-contacting surface 78 supported by ribs 80. A set of hook-shaped appendages 82 extends outward generally perpendicularly from the base. The appendages are similar to those of the previous versions. The hook portions of all the appendages angle from the shank portions in the same direction. A nub 87 formed on the shank portion of the outermost appendages near the base removes play in the receptacles and helps stabilize the attachment element in place. Also extending from the base of the attachment element are flanges 84, 84' that flank the appendages and form a contact surface 85, 85' generally perpendicular to the outwardly extending appendages and coplanar with the base.

Figure 9A:
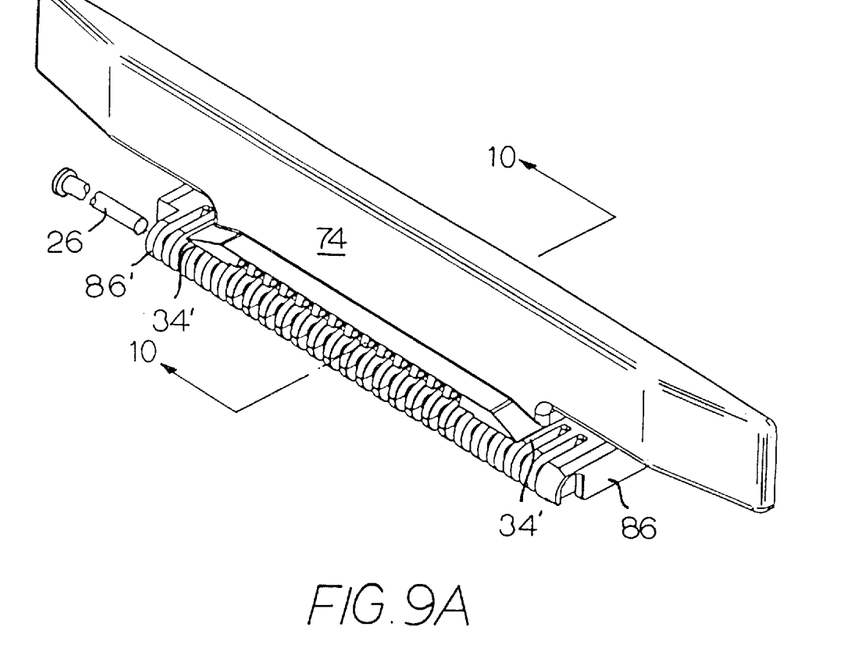
FIG. 9A is a top isometric view of an attachment element as in FIG. 8 connected into one row of a conveyor belt in a conveying condition of the belt.
Figure 9B:
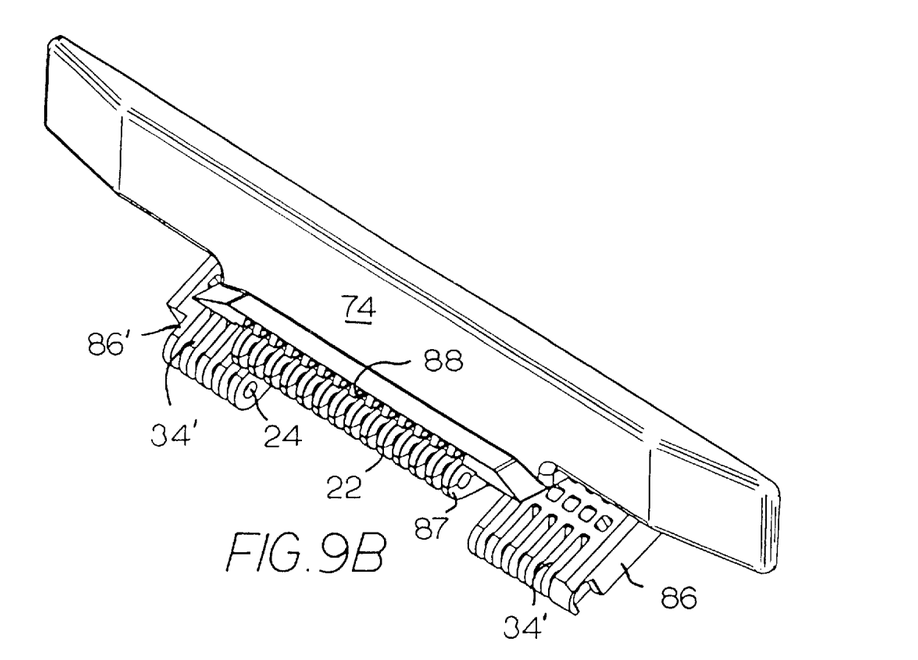
FIG. 9B is a top isometric view as in FIG. 9A with the conveyor belt in an assembly condition.
Figure 10:
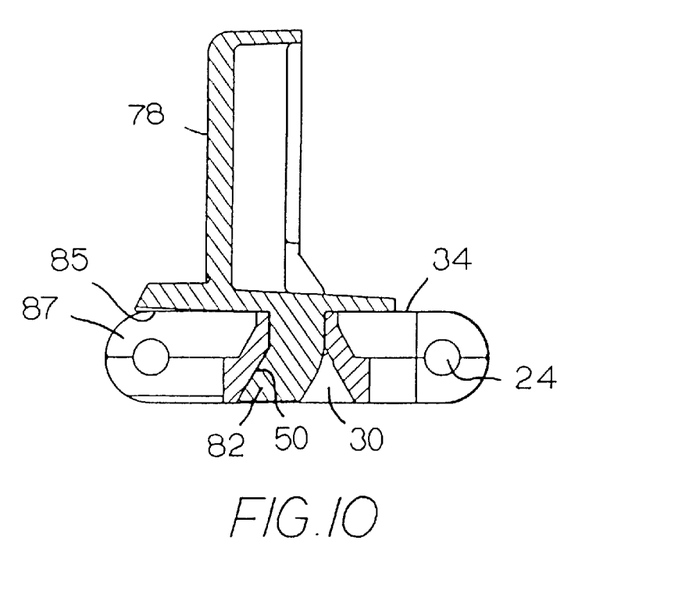
FIG. 10 is a side cross-section of the conveyor belt and attachment element of FIG. 9A taken along line 10—10.

The attachment element is inserted into a belt row as shown in FIG. 9B into the locked position of FIGS. 9A and 10. In the belt assembly condition of FIG. 9B, edge modules 86, 86' are free to pivot relative to an interior module 87 because no hinge pin interconnects the modules at the end in the foreground of FIG. 9B. This allows the appendages to be inserted into associated mating receptacles 30 opening onto the top surface 34 of the interior module 87. The edge modules must be pivoted out of the way into a non-coplanar relationship with the interior modules. Otherwise, the contact surfaces 85, 85', by contact with the top outer surface 34' of the edge modules, would obstruct the appendages from being inserted. Grooves 88 formed along an edge of the base of the attachment element are sized and spaced to provide clearance for the hinge elements 22 of the internal module during assembly. Once the appendages are in place in the receptacles and the attachment element is rotated to its operational position, the edge modules 86, 86' are aligned to be generally coplanar with the interior module 87 in an assembled, operational conveying condition of the belt. A hinge pin 26 inserted through aligned holes 24 in the hinge elements maintains the side-by-side arrangement of the row and interconnects it to an adjacent row (not shown). In the conveying condition of the belt, shown in FIGS. 9A and 10, the basal flanges act as contact members that are in contact with the top outer surface 34' of the row. In this way, the top outer surface acts as a blocking surface to prevent the hook-shaped appendages from backing out of the receptacles. The dual interaction of the appendages 82 with the constraining blocking surfaces 50 of the receptacles 30 and of the contact member, or flange, with the top outer surface, or blocking surface, of the row locks the attachment element firmly in place in the belt.

Thus, the conveyor belt and attachment elements described provide an attachment element with any number of custom characteristics that can be firmly attached to a standard belt row.

The invention has been described with respect to a few specific versions of conveyor belt and attachment elements, but other variations are possible. For example, the contact member of an attachment element could contact blocking structure in another belt row. As another example, each row could include multiple attachment elements with blocking structure that could interact too in a conveying condition of the belt to block their removal. As yet another example, each row could be constructed of a single flexible belt module capable of being twisted from a generally planar shape in a conveying condition to a non-planar shape in an assembly condition with hinge pins removed to permit the attachment element to be inserted into or removed from the row. As these few examples suggest, those skilled in the art will appreciate that other versions are possible without materially departing from the novel teaching and advantages of the invention. The invention defined in the following claims is not meant to be limited to the examples described in detail.

What is claimed is:

1. A conveyor belt comprising:
    a plurality of belt modules and hinge pins forming a plurality of rows of belt modules hingedly linked end to end by hinge pins into a conveyor belt having outer belt surfaces;
    at least some of the rows including blocking structure and one or more receptacles opening onto an outer belt surface, the receptacles bounded at least partly by blocking surfaces formed in the belt modules;
    an attachment element including a set of appendages and a contact member, the set of appendages extending outwardly from the attachment element, wherein the attachment element is firmly attached to the conveyor belt with the set of appendages inserted in the receptacles and constrained by the blocking surfaces while the contact member of the attachment element is in contact with the blocking structure.

2. A conveyor belt as in claim 1, wherein the appendages are hook-shaped.

3. A conveyor belt as in claim 1, wherein the set of appendages includes a plurality of appendages.

4. A conveyor belt as in claim 3, wherein the appendages are linearly arranged.

5. A conveyor belt as in claim 3, wherein the appendages are shaped the same.

6. A conveyor belt as in claim 1, wherein the appendages and the blocking structure are complementarily shaped.

7. A conveyor belt as in claim 1, wherein the appendages include a shank portion extending from the attachment element and a hook portion angling from the shank portion.

8. A conveyor belt as in claim 7, wherein the hook portion angles from the shank portion at an obtuse angle.

9. A conveyor belt as in claim 7, wherein the hook portion of the appendages angles from the shank portion toward a leading belt row and wherein the contact member includes a shank portion extending from the attachment element and a hook portion angling from the shank portion toward a trailing belt row.

10. A conveyor belt as in claim 1, wherein an outer belt surface forms the blocking structure.

11. A conveyor belt as in claim 1, wherein the contact member comprises a flange extending outward from the attachment member generally perpendicular to the outwardly extending appendages.

12. A conveyor belt as in claim 1, wherein the set of appendages is inserted in one module in a belt row and the contact member is in contact with the blocking structure of another module in the row.

13. A conveyor belt as in claim 1, wherein a hinge pin along the row forms the blocking structure on its lateral surface.

14. A conveyor belt as in claim 1, wherein the contact member of the attachment element contacts blocking structure on the same row.

15. A conveyor belt comprising:
  a plurality of rows of belt modules hingedly linked end to end into a conveyor belt having first and second outer belt surfaces;
  at least some of the rows including belt modules having structure forming a series of receptacles spaced apart across the width of the row and opening onto an outer belt surface;
  an attachment element including a rigid base and first and second sets of appendages, the sets alternately arranged to extend from the base to distal ends, wherein distal ends of the first set of appendages extend in one direction and the distal ends of the second set extend in a different direction; and
  wherein the attachment element is firmly attached to the conveyor belt by inserting the first set of appendages into the receptacles in a first module of a row and by inserting the second set of differently-directed appendages into the receptacles in a second module of the row.

16. A conveyor belt as in claim 15, wherein the distal ends of the appendages of the second set are directed opposite to the distal ends of the appendages of the first set.

17. A conveyor belt as in claim 15, wherein the distal ends of the appendages of the first set extend toward a leading end of the first module in a row of the conveyor belt and the distal ends of the appendages of the second set extend toward a trailing end of the second module in the row.

18. A conveyor belt as in claim 15, wherein each set includes a plurality of appendages.

19. A conveyor belt as in claim 18, wherein the appendages of each set are uniformly spaced along the base of the attachment element.

20. A conveyor belt as in claim 18, wherein the appendages of each set are identical to one another.

21. A conveyor belt as in claim 15, wherein the appendages are shaped to match a complementary-shaped portion of the associated receptacles.

22. A conveyor belt as in claim 15, wherein the outer surface of the modules must be tilted relative to the base of the attachment element for the receptacles to receive the appendages.

23. A conveyor belt as in claim 15, wherein the attachment element is a flight and wherein the receptacles open onto the first outer belt surface, which is a top belt surface.

24. A conveyor belt comprising:
  a plurality of rows of belt modules hingedly linked end to end into a conveyor belt having outer belt surfaces;
  at least some of the rows including belt modules having structure forming a series of receptacles spaced apart across the width of the row and opening onto an outer belt surface;
  an attachment element including a basal flange and a set of hook-like appendages, wherein the appendages include a shank portion extending from the attachment element and a hook portion angling from the shank portion; and
  wherein the receptacles are shaped to admit the appendages along an insertion angle for which the basal flange element avoids contact with the outer belt surfaces of the row and to block the appendages from removal when the basal flange contacts an outer belt surface.

25. An attachment element for a conveyor belt comprising:
  an accessory portion;
  a base along a side of the accessory portion; and
  a set of appendages including a shank portion extending from the base and a hook portion extending from the shank portion opposite the base; and
  a contact member extending from the base in a different direction from the set of appendages.

26. An attachment element for a conveyor belt as in claim 25, wherein the contact member comprises a flange extending generally perpendicular to the shank portion.

27. An attachment element as in claim 25, wherein the hook portion extends obliquely from the shank portion.

28. An attachment element as in claim 25, wherein the set of appendages includes a plurality of appendages.

29. An attachment element for a conveyor belt, comprising:
  an accessory portion;
  a base extending along a side of the accessory portion;
  a set of hook-like appendages extending outward from the base; and
  a pair of flanges flanking the set of hook-like appendages and extending in a direction different from the hook-like appendages.

30. An attachment element as in claim 29, wherein the base forms a planar surface from which the hook-like appendages extend perpendicularly and wherein the flanges include surfaces coplanar with the planar surface of the base.

31. A conveyor belt comprising:
  a plurality of belt modules and hinge pins forming a plurality of rows of belt modules hingedly linked end to end by hinge pins into a conveyor belt having top and bottom outer belt surfaces, wherein each row generally defines a plane in a conveying condition of the belt and wherein each row deviates from a plane in an assembly condition of the belt;
  at least some of the rows including blocking structure and one or more receptacles opening onto an outer belt surface, the receptacles bounded at least partly by blocking surfaces formed in the belt modules;
  an attachment element including a set of appendages and a contact member, the set of appendages extending outwardly from the attachment element in one direction and the contact member extending in a different direction, wherein the set of appendages is insertable into and removable from the receptacles in the assembly condition of the belt and wherein the dual interaction of the set of appendages in the receptacles with the blocking surfaces and of the contact member with the blocking structure retains the attachment element firmly in place in the conveying condition of the belt.

32. A conveyor belt as in claim 31, wherein each belt row includes a plurality of side-by-side belt modules and each row is convertible to the assembly condition in the absence of a hinge pin along an end of the row.

* * * * *